United States Patent
Choi (10) Patent No.: US 9,232,291 B2
(45) Date of Patent: Jan. 5, 2016

(54) MOBILE TERMINAL

(71) Applicant: LG Electronics Inc., Seoul (KR)

(72) Inventor: Iwon Choi, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 14/031,253

(22) Filed: Sep. 19, 2013

(65) Prior Publication Data

US 2014/0079269 A1 Mar. 20, 2014

(30) Foreign Application Priority Data

Sep. 20, 2012 (KR) .......................... 10-2012-0104735

(51) Int. Cl.
*H04R 9/08* (2006.01)
*H04R 1/04* (2006.01)
*H04R 1/34* (2006.01)
*H04R 1/08* (2006.01)
*H04M 1/03* (2006.01)

(52) U.S. Cl.
CPC . *H04R 1/04* (2013.01); *H04M 1/03* (2013.01); *H04R 1/083* (2013.01); *H04R 1/342* (2013.01); *H04R 2499/11* (2013.01)

(58) Field of Classification Search
CPC .......... H04M 1/03; H04M 1/026; H04R 1/08; H04R 1/083; H04R 1/406; H04R 3/005; H04R 9/08; H04R 2410/03; H04R 2499/11; H04R 1/04; H04R 1/086; H04R 1/342
USPC ........ 381/334, 355, 356, 357, 361, 365, 368, 381/397, 409, 410; 379/430, 420.03, 431, 379/433.02, 433.05; 361/688, 697, 704
See application file for complete search history.

(56) References Cited

U.S. PATENT DOCUMENTS

| | | | | |
|---|---|---|---|---|
| 3,778,551 A | * | 12/1973 | Grodinsky | .................... 381/335 |
| 5,097,513 A | * | 3/1992 | Jordan et al. | ................... 381/160 |
| 5,836,790 A | * | 11/1998 | Barnett | ..................... 439/620.22 |
| 2009/0042623 A1 | * | 2/2009 | Shiono et al. | .............. 455/575.1 |

* cited by examiner

*Primary Examiner* — Huyen D Le
(74) *Attorney, Agent, or Firm* — Ked & Associates, LLP (57) ABSTRACT

Provided is a mobile terminal including a terminal body, a printed circuit board provided in the terminal body, and a microphone provided on the printed circuit board a prescribed distance from the terminal body. The printed circuit board may be provided between an opening in the terminal body and the microphone, and a channel may be provided that extends from the opening in the terminal body to the microphone.

13 Claims, 7 Drawing Sheets

MOBILE TERMINAL

CROSS-REFERENCE TO RELATED APPLICATION(S)

This application claims priority under 35 U.S.C. §119 to Korean Application No. 10-2012-0104735 filed in Korea on Sep. 20, 2012, whose entire disclosure is hereby incorporated by reference.

BACKGROUND

1. Field

Provided is a mobile terminal having a printed circuit board with a microphone mounted thereon.

2. Background

Mobile terminals having microphones are known. However, they suffer from various disadvantages.

BRIEF DESCRIPTION OF THE DRAWINGS

The embodiments will be described in detail with reference to the following drawings in which like reference numerals refer to like elements wherein.

DETAILED DESCRIPTION

Mobile terminals may be implemented using a variety of different types of terminals. Examples of such terminals include mobile terminals, such as mobile phones, smart phones, notebook computers, digital broadcast terminals, Personal Digital Assistants (PDA), Portable Multimedia Players (PMP), navigators, and the like, as well as stationary terminals, such as digital TVs, desktop computers, and the like. The following description assumes that the terminal is a mobile terminal. However, it will be apparent to those skilled in the art that the following disclosure also to the stationary terminals, except where features are particularly provided to enable mobility.

Mobile terminals are multifunctional devices. A mobile terminal may be used to capture still images or moving images, play music or video files, play games, receive broadcast, and the like, so as to be implemented as an integrated multimedia player. A mobile terminal may also have one or more of functions, for example, to support voice and video telephony calls, inputting and/or outputting information, storing data, and the like. As additional features and functions are added to these mobile terminals, improvement of structural components the mobile terminal becomes necessary as well as software or hardware improvements. For example, improvements to structural components are necessary to prevent increase in size of the mobile terminal due to added components as well as to reduce the size for aesthetic reasons.

In a mobile terminal a microphone is usually installed on the front lower end of a mobile terminal to be close to a user's mouth. The installed position of the microphone should be determined in association with other components, such as an input device or a display. For example, the position of the microphone on a front surface of the mobile terminal below the input device has an advantage in performance of the microphone, but also has a disadvantage in extending the length of the mobile terminal or reducing the size of the area available for the display.

The microphone may also be provided on a size surface near the bottom end of the mobile terminal. Here, when a direction in which the user's voice is received through the microphone is different from a direction of a microphone hole connected to the microphone, performance of the microphone may be degraded. Further, to make mobile terminals slimmer it is desirable to reduce the size of electronic components mounted in the mobile terminals or mounting spaces thereof. Such attempts may be made in association with mounting of the microphone.

Therefore, an aspect of the detailed description is to provide a mobile terminal which has a slimmer profile by simplifying an assembly of a microphone and a printed circuit board as well as a mounting space of the microphone. Another aspect of the detailed description is to provide a more stable physical and electrical connection between a microphone and a printed circuit board.

Figure 1:
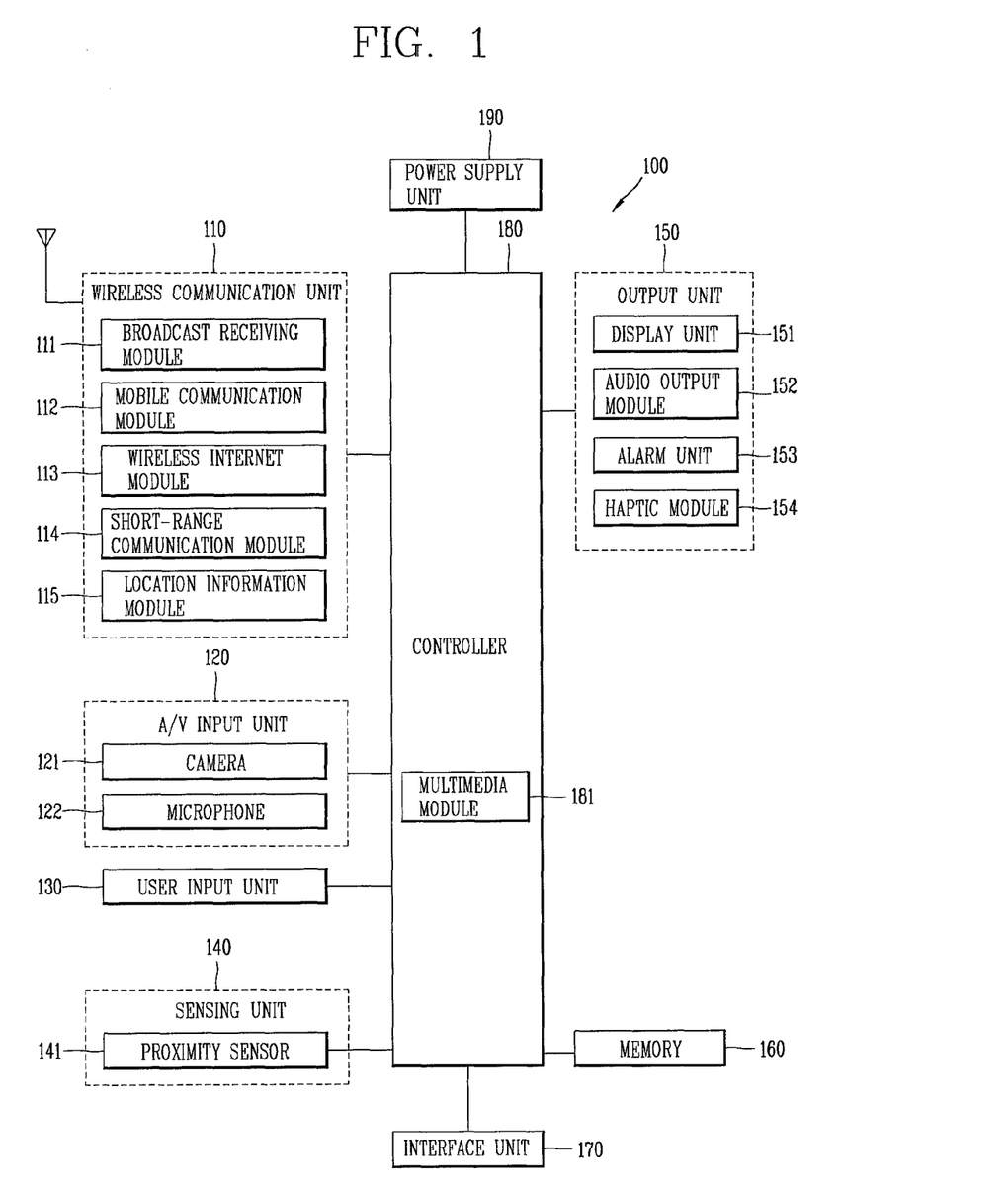
FIG. 1 is a block diagram of a mobile terminal in accordance with one exemplary embodiment.

FIG. 1 is a block diagram of a mobile terminal 100 in accordance with one embodiment of the present disclosure. The mobile terminal 100 may include a wireless communication device 110, an A/V (Audio/Video) input device 120, a user input device 130, a sensing device 140, an output device 150, a memory 160, an interface device 170, a controller 180, and a power supply 190, etc. FIG. 1 shows the mobile terminal as having various components, but it should be understood that implementing all of the illustrated components is not a requirement. Greater or fewer components may alternatively be implemented.

The wireless communication device 110 may include one or more components allowing radio communication between the mobile terminal 100 and a wireless communication system or a network in which the mobile terminal is located. For example, the wireless communication device may include at least one of a broadcast receiving module 111, a mobile communication module 112, a wireless Internet module 113, a short-range communication module 114, a location information module 115, and the like.

The broadcast receiving module 111 receives broadcast signals and/or broadcast associated information from an external broadcast management server (or other network entity) via a broadcast channel. The broadcast channel may include a satellite channel and/or a terrestrial channel. The broadcast management server may be a server that generates and transmits a broadcast signal and/or broadcast associated information or a server that receives a previously generated broadcast signal and/or broadcast associated information and transmits the same to a terminal. The broadcast signal may include a TV broadcast signal, a radio broadcast signal, a data broadcast signal, and the like. Also, the broadcast signal may further include a broadcast signal combined with a TV or radio broadcast signal.

Examples of broadcast associated information may include information associated with a broadcast channel, a broadcast program, a broadcast service provider, and the like. The broadcast associated information may be provided via a mobile communication network, and received by the mobile communication module 112. The broadcast associated information may be implemented in various formats. For instance, broadcast associated information may include Electronic Program Guide (EPG) of Digital Multimedia Broadcasting (DMB), Electronic Service Guide (ESG) of Digital Video Broadcast-Handheld (DVB-H), and the like.

The broadcast receiving module 111 may be configured to receive digital broadcast signals transmitted from various types of broadcast systems. Such broadcast systems may include Digital Multimedia Broadcasting-Terrestrial (DMB-T), Digital Multimedia Broadcasting-Satellite (DMB-S), Media Forward Link Only (MediaFLO), Digital Video Broadcast-Handheld (DVB-H), Integrated Services Digital Broadcast-Terrestrial (ISDB-T) and the like. The broadcast receiving module 111 may be configured to be suitable for every broadcast system transmitting broadcast signals as well as the digital broadcasting systems. Broadcast signals and/or broadcast associated information received via the broadcast receiving module 111 may be stored in a suitable device, such as a memory 160.

The mobile communication module 112 transmits/receives wireless signals to/from at least one of network entities (e.g., base station, an external mobile terminal, a server, etc.) on a mobile communication network. Here, the wireless signals may include audio call signal, video (telephony) call signal, or various formats of data according to transmission/reception of text/multimedia messages.

The wireless Internet module 113 supports wireless Internet access for the mobile terminal. This module may be internally or externally coupled to the mobile terminal 100. Examples of such wireless Internet access may include Wireless LAN (WLAN) (Wi-Fi), Wireless Broadband (Wibro), Worldwide Interoperability for Microwave Access (Wimax), High Speed Downlink Packet Access (HSDPA) and the like.

The short-range communication module 114 denotes a module for short-range communications. Suitable technologies for implementing this module may include BLUETOOTH™, Radio Frequency IDentification (RFID), Infrared Data Association (IrDA), Ultra-WideBand (UWB), ZigBee™, and the like.

The location information module 115 denotes a module for detecting or calculating a position of a mobile terminal. An example of the location information module 115 may include a Global Position System (GPS) module.

Referring to FIG. 1, the A/V input device 120 is configured to provide audio or video signal input to the mobile terminal. The A/V input device 120 may include a camera 121 and a microphone 122. The camera 121 may receive and process image frames of still pictures or video obtained by image sensors in a video call mode or a capturing mode. The processed image frames may be displayed on the display device 151.

The image frames processed by the camera 121 may be stored in the memory 160 or transmitted to the exterior via the wireless communication device 110. Two or more cameras 121 may be provided according to the configuration of the mobile terminal.

The microphone 122 may receive an external audio signal while the mobile terminal is in a particular mode, such as a phone call mode, a recording mode, a voice recognition mode, or the like. This audio signal is processed into digital data. The processed digital data is converted for output into a format transmittable to a mobile communication base station via the mobile communication module 112 in case of the phone call mode. The microphone 122 may include assorted noise cancellation algorithms to remove noise generated in the course of receiving the external audio signal.

The user input device 130 may generate input data input by a user to control the operation of the mobile terminal. The user input device 130 may include a keypad, a dome switch, a touchpad (e.g., static pressure/capacitance), a jog wheel, a jog switch, and the like.

The sensing device 140 provides status measurements of various aspects of the mobile terminal. For instance, the sensing device 140 may detect an open/close status of the mobile terminal, a change in a location, position or orientation of the mobile terminal 100, a presence or absence of user contact with the mobile terminal 100, the location of the mobile terminal 100, acceleration/deceleration of the mobile terminal 100, and the like, so as to generate a sensing signal for controlling the operation of the mobile terminal 100. For example, regarding a slide-type mobile terminal, the sensing device 140 may sense whether a sliding portion of the mobile terminal is open or closed. Other examples include sensing functions, such as the sensing device 140 sensing the presence or absence of power provided by the power supply 190, the presence or absence of a coupling or other connection between the interface device 170 and an external device. Meanwhile, the sensing device 140 may include a proximity sensor 141.

The output device 150 is configured to output an audio signal, a video signal or a tactile signal. The output device 150 may include a display device 151, an audio output module 152, an alarm 153 and a haptic module 154.

The display 151 may output information processed in the mobile terminal 100. For example, when the mobile terminal is operating in a phone call mode, the display 151 may provide a User Interface (UI) or a Graphic User Interface (GUI) which includes information associated with the call. As another example, if the mobile terminal is in a video call mode or a capturing mode, the display 151 may additionally or alternatively display images captured and/or received, UI, or GUI.

The display 151 may be implemented using, for example, at least one of a Liquid Crystal Display (LCD), a Thin Film Transistor-Liquid Crystal Display (TFT-LCD), an Organic Light-Emitting Diode (OLED), a flexible display, a three-dimensional (3D) display or the like. Some of such displays 151 may be implemented as a transparent type or an optical transparent type through which the exterior is visible, which is referred to as "transparent display." A representative example of the transparent display may include a Transparent OLED (TOLED), and the like. The rear surface of the display 151 may also be implemented to be optically transparent. Under this configuration, a user can view an object positioned at a rear side of a terminal body through a region occupied by the display 151 of the terminal body.

The display 151 may be implemented in two or more in number according to a configured aspect of the mobile terminal 100. For instance, a plurality of the displays 151 may be arranged on one surface to be spaced apart from or integrated with each other, or may be arranged on different surfaces.

Here, if the display 151 and a touch sensitive sensor (also referred to as a touch sensor) have a layered structure therebetween, the structure may be referred to as a touch screen. The display 151 may be used as an input device rather than an output device. The touch sensor may be implemented as a touch film, a touch sheet, a touchpad, and the like.

The touch sensor may be configured to convert changes of a pressure applied to a specific part of the display 151, or a capacitance occurring from a specific part of the display 151, into electric input signals. Also, the touch sensor may be configured to sense not only a touched position and a touched area, but also touch pressure.

When touch inputs are sensed by the touch sensors, corresponding signals are transmitted to a touch controller. The touch controller processes the received signals, and then transmits corresponding data to the controller 180. Accordingly, the controller 180 may sense which region of the display 151 has been touched.

Still referring to FIG. 1, a proximity sensor 141 may be arranged at an inner region of the mobile terminal 100 covered by the touch screen, or near the touch screen. The proximity sensor 141 indicates a sensor to sense presence or absence of an object approaching to a surface to be sensed, or an object disposed near a surface to be sensed, by using an electromagnetic field or infrared rays without a mechanical contact. The proximity sensor 141 has a longer lifespan and a more enhanced utility than a contact sensor.

Examples of the proximity sensor 141 may include a transmissive type photoelectric sensor, a direct reflective type photoelectric sensor, a mirror reflective type photoelectric sensor, a high-frequency oscillation proximity sensor, a capacitance type proximity sensor, a magnetic type proximity sensor, an infrared rays proximity sensor, and so on. When the touch screen is implemented as a capacitance type, proximity of a pointer to the touch screen is sensed by changes of an electromagnetic field. In this case, the touch screen (touch sensor) may be categorized into a proximity sensor.

Hereinafter, merely for purposes of brevity and convenience, a status that the pointer is positioned to be proximate onto the touch screen without contact will be referred to as "proximity touch," whereas a status that the pointer substantially comes in contact with the touch screen will be referred to as "contact touch." For the position corresponding to the proximity touch of the pointer on the touch screen, such position may correspond to a position where the pointer faces perpendicular to the touch screen upon the proximity touch of the pointer.

The proximity sensor 141 senses a proximity touch and proximity touch patterns (e.g., distance, direction, speed, time, position, moving status, etc.). Information relating to the sensed proximity touch and the sensed proximity touch patterns may be output onto the touch screen.

The audio output module 152 may output audio data received from the wireless communication device 110 or stored in the memory 160, in a call-receiving mode, a call-placing mode, a recording mode, a voice recognition mode, a broadcast reception mode, and so on. The audio output module 152 may output audio signals relating to functions performed in the mobile terminal 100, e.g., sound alarming a call received or a message received, and so on. The audio output module 152 may include a receiver, a speaker, a buzzer, and so on.

The alarm 153 may output signals notifying occurrence of events from the mobile terminal 100. The events occurring from the mobile terminal 100 may include call received, message received, key signal input, touch input, and so on. The alarm 153 may output not only video or audio signals, but also other types of signals such as signals notifying occurrence of events in a vibration manner. Since the video or audio signals can be output through the display 151 or the audio output module 152, the display 151 and the audio output module 152 may be categorized into a part of the alarm 153.

The haptic module 154 may generate various tactile effects which a user can feel. A representative example of the tactile effects generated by the haptic module 154 includes vibration. Vibration generated by the haptic module 154 may have a controllable intensity, a controllable pattern, and so on. For instance, different vibration may be output in a synthesized manner or in a sequential manner.

The haptic module 154 may generate various tactile effects, including not only vibration, but also arrangement of pins vertically moving with respect to a skin being touched (contacted), air injection force or air suction force through an injection hole or a suction hole, touch by a skin surface, presence or absence of contact with an electrode, effects by stimulus such as an electrostatic force, reproduction of cold or hot feeling using a heat absorbing device or a heat emitting device, and the like.

The haptic module 154 may be configured to transmit tactile effects (signals) through a user's direct contact, or a user's muscular sense using a finger or a hand. The haptic module 154 may be implemented in two or more in number according to the configuration of the mobile terminal 100.

The memory 160 may store a program for the processing and control of the controller 180. Alternatively, the memory 160 may temporarily store input/output data (e.g., phonebook data, messages, still images, video and the like). Also, the memory 160 may store data related to various patterns of vibrations and audio output upon the touch input on the touch screen.

The memory 160 may be implemented using any type of suitable storage medium including a flash memory type, a hard disk type, a multimedia card micro type, a memory card type (e.g., SD or DX memory), Random Access Memory (RAM), Static Random Access Memory (SRAM), Read-Only Memory (ROM), Electrically Erasable Programmable Read-Only Memory (EEPROM), Programmable Read-Only Memory (PROM), magnetic memory, magnetic disk, optical disk, and the like. Also, the mobile terminal 100 may operate a web storage which performs the storage function of the memory 160 on the Internet.

The interface device 170 may generally be implemented to interface the mobile terminal with external devices. The interface device 170 may allow a data reception from an external device, a power delivery to each component in the mobile terminal 100, a data transmission from the mobile terminal 100 to an external device, or may prove another appropriate type of interfacing based on application. The interface device 170 may include, for example, wired/wireless headset ports, external charger ports, wired/wireless data ports, memory card ports, ports for coupling devices having an identification module, audio Input/Output (I/O) ports, video I/O ports, earphone ports, and the like.

The identification module may be configured as a chip for storing various information required to authenticate an authority to use the mobile terminal 100, which may include a User Identity Module (UIM), a Subscriber Identity Module (SIM), and the like. Also, the device having the identification module (hereinafter, referred to as 'identification device') may be implemented in a type of smart card. Hence, the identification device can be coupled to the mobile terminal 100 via a port.

Also, the interface device 170 may serve as a path for power to be supplied from an external cradle to the mobile terminal 100 when the mobile terminal 100 is connected to the external cradle or as a path for transferring various command signals input from the cradle by a user to the mobile terminal 100. Such various command signals or power input from the cradle may operate as signals for recognizing that the mobile terminal 100 has accurately been mounted to the cradle.

The controller 180 typically controls the overall operations of the mobile terminal 100. For example, the controller 180 performs the control and processing associated with telephony calls, data communications, video calls, and the like. The controller 180 may include a multimedia module 181 which provides multimedia playback. The multimedia module 181 may be configured as part of the controller 180 or as a separate component. The controller 180 may perform a pattern recognition processing so as to recognize writing or drawing input on the touch screen as text or image.

The power supply 190 may provide power required by various components under the control of the controller 180. The provided power may be internal power, external power, or combination thereof.

Various embodiments described herein may be implemented in a computer-readable medium using, for example, software, hardware, or some combination thereof.

For a hardware implementation, the embodiments described herein may be implemented within one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, microprocessors, other electronic devices designed to perform the functions described herein, or a selective combination thereof. In some cases, such embodiments are implemented by the controller 180.

For software implementation, the embodiments such as procedures and functions may be implemented together with separate software modules each of which performs at least one of functions and operations. The software codes can be implemented with a software application written in any suitable programming language. Also, the software codes may be stored in the memory 160 and executed by the controller 180.

Figure 2:
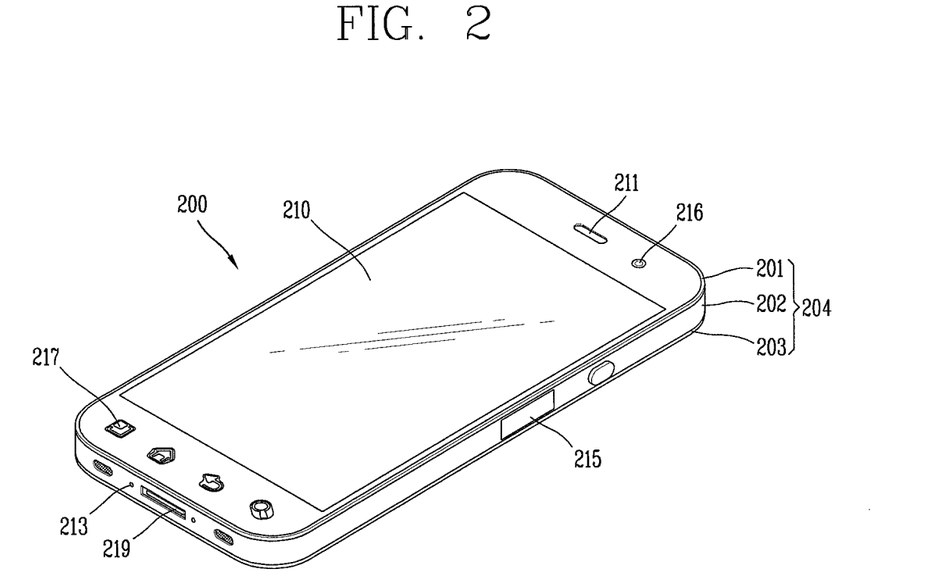
FIG. 2 is a front perspective view of the mobile terminal.
Figure 3:
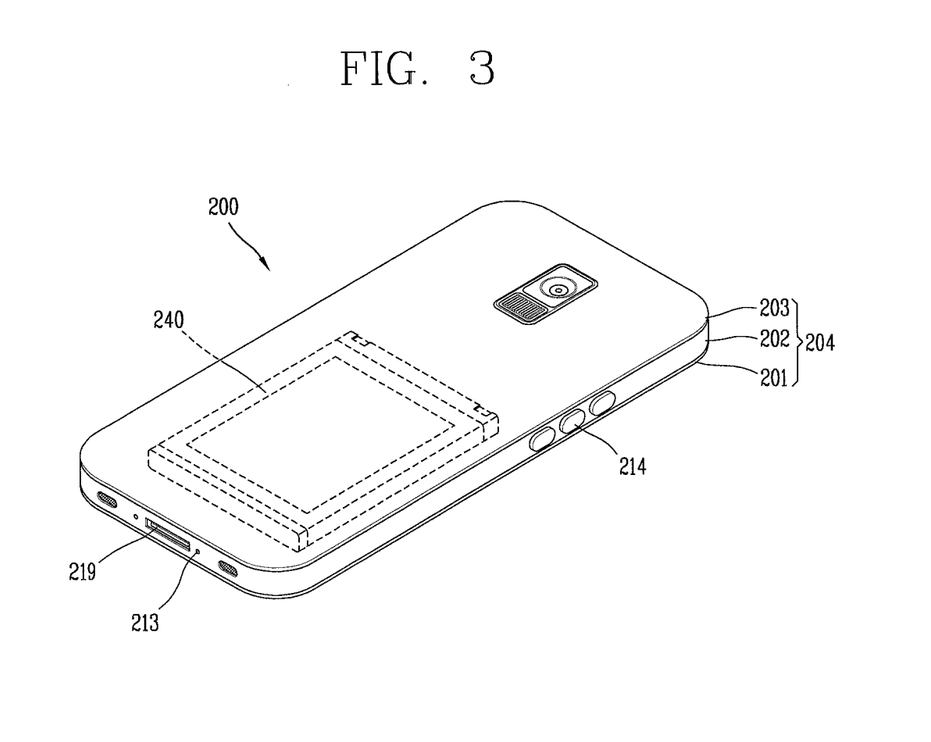
FIG. 3 is a rear perspective view of the mobile terminal shown in FIG. 2.

FIG. 2 is a front perspective view showing an example of the mobile terminal, and FIG. 3 is a rear perspective of the mobile terminal of FIG. 2. A mobile terminal 200 may be provided with a bar-type terminal body 204. However, the present disclosure is not limited to this type of terminal, but may also be applicable to various structures of terminals such as slide type, folder type, swivel type, swing type, and the like, in which two or more bodies are combined with each other in a relatively movable manner. In addition, the mobile terminal as described herein may also be applied to portable electronic devices having a camera and flash, for example, smart phones, cellular phones, notebook computers, digital broadcast terminals, Personal Digital Assistants (PDAs), Portable Multimedia Player (PMO) and the like.

The mobile terminal 200 may include the terminal body 204 defining an appearance thereof. The terminal body 204 may include one or more cases (or referred to as casing, housing, cover, etc.) that define an outer appearance of the terminal body 204. The case may be divided into a front case 201, a rear case 202, and a battery cover 203 which may cover a rear surface of the rear case 202. A space or cavity formed between the front and rear cases 201 and 202 may accommodate various electronic components. Such cases may be injected using a synthetic resin or be formed of a metal, such as stainless steel (STS), titanium (Ti) or the like.

The front surface of the terminal body 204 may include a display 210, a first audio output module 211, a front camera 216, a side key 214, an interface device 219 and a signal input device 217. The display 210 may include an LCD module, an OLED module, an e-paper and the like to output visual information. The display 210 may include a touch sensing device to input information in a touching manner. Hereinafter, the display 210 having the touch sensing device may be referred to as "touch screen."

When a touch input is sensed on a portion on the touch screen 210, contents corresponding to the touched position may be inputted. The contents inputted in the touching manner may be text or numerals, or menu items which may be indicated or set in various modes. The touch sensing device may be transparent such that the display module can be visible, and include a structure for enhancing visibility of the touch screen at a bright place. Referring to FIG. 2, the touch screen 210 may occupy most of the front surface of the front case 201.

The first audio output module 211 may be implemented as a receiver to transfer a call sound to a user's ear, or a loud speaker for outputting various alarm sounds or multimedia reproduction sounds. The front camera 216 may receive and process image frames of still pictures or video obtained by image sensors in a video call mode or a capturing mode. The processed image frames may be displayed on the display 210. The image frames processed by the front camera 216 may be stored in the memory 160 or transmitted to an external device through the wireless communication device 110. Two or more front cameras 216 may be provided according to the use environment of the mobile terminal.

The signal input device 217 may be manipulated to allow inputting of commands for controlling operations of the mobile terminal 200, and include a plurality of input keys. The plurality of input keys may be referred to as a manipulating portion. Such manipulating portion can employ any tactile manner that a user can touch or tap for manipulation. For instance, the manipulating portion may be implemented as a dome switch, a touchpad, a touchpad, or the like, by which a user can input commands or information in a pushing or touching manner. Alternatively, the manipulating portion may be implemented as a wheel or a jog which rotates keys or a joystick. Contents inputted by the signal input device 217 may be set in various manners. For example, the signal input device 217 may be to input commands such as START, END, SCROLL or the like.

A side surface of the front case 201 is shown having a side key 214, an interface device 219, an audio input device 213 and the like. The side key 214 may be referred to as a manipulation device, and allowed to receive command for controlling operations of the mobile terminal 200. The side key 214 may employ any tactile manner that a user can touch or tap for manipulation. Contents inputted by the side key 214 may be set in various manners. For example, the side key 214 may be configured to input commands, such as a control of the image input devices 216, 221, a volume adjustment of sounds output from the audio output module 211, conversion of the display 210 into a touch recognition mode, or the like. The audio input device 213 may be implemented, for example, as a microphone for receiving user's voice, other sounds and the like.

The interface device 219 may serve as a path for data exchange between the mobile terminal 200 and external devices. For example, the interface device 219 may be at least one of wired/wireless earphone ports, ports for short-range communication (e.g., IrDA, Bluetooth, WLAN, etc), power supply terminals for power supply to the mobile terminal and the like. The interface device 219 may be a card socket for coupling to external cards, such as a Subscriber Identity Module (SIM), a User Identity Module (UIM), a memory card for storage of information, and the like.

A rear surface of the terminal body 204 is shown having a power supply 240 and a rear camera 221. A flash 222 and a mirror may additionally be disposed adjacent to the rear camera 221. The flash 222 may operate in conjunction with the rear camera 221 when taking a picture using the rear camera 221. The mirror may be used together with the rear camera 221 to allow a user to photograph himself in a self-portrait mode. The rear camera 221 faces a direction which is opposite to a direction faced by the front camera 216, and may have different pixels from those of the front camera 216.

For example, the front camera 216 may operate with relatively lower pixels (lower resolution). Thus, the camera 121 may be useful when a user can capture his face and send it to another party during a video call, or the like. On the other hand, the rear camera 221 may operate with a relatively higher pixels (higher resolution) such that it can be useful for a user to obtain higher quality pictures for later use. The front and rear cameras 216 and 221 may be installed on the terminal body 204 to be rotatable, to pop up, or another appropriate configuration.

The battery 240 for supplying power to the mobile terminal 200 may be mounted in the terminal body. The battery 240 may be mounted in the terminal body or detachably coupled directly onto the outside of the terminal body.

Figure 4:
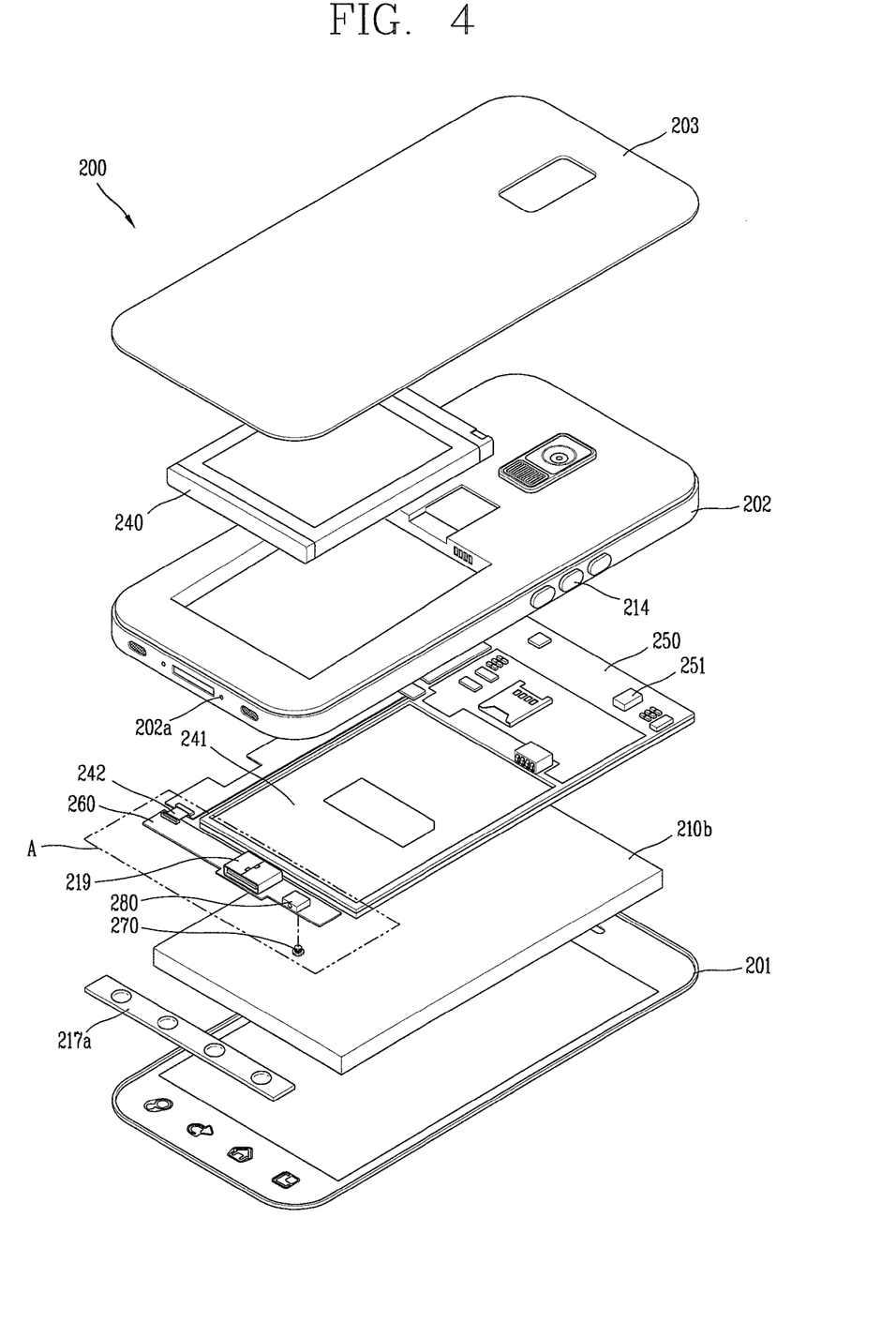
FIG. 4 is a disassembled perspective view of FIG. 3.

FIG. 4 is a disassembled perspective view of FIG. 3. The mobile terminal may include a window 210*a* and a display module 210*b* which configure the display 210. The window 210*a* may be integrally coupled to the front case 201.

A frame 241 for supporting electrical devices may be formed between the front case 201 and the rear case 202. The frame 241 is a supporting structure within the terminal. As one example, the frame 241 may support at least one of the display module 210*b*, the camera module 221, an antenna element, a battery 240 or a printed circuit board 250. The frame 241 may be partially exposed to the outside of the terminal. The frame 241 may also configure a part of a sliding module, which connects a body part and a display in a slide-type terminal other than a bar-type terminal.

As shown in FIG. 4, the printed circuit board 250 may be located between the frame 241 and the rear case 202, and the display module 210*b* may be coupled to one surface of the frame 241. The printed circuit board 250 and the battery 240 may be disposed on the other surface of the frame 241. The battery case 203 may be coupled to the rear case 202 to cover the battery 240.

The window 210*a* may be coupled to one surface of the front case 201. A touch sensor may be mounted onto the window 210*a*. The touch sensor may sense a touch input, and be light-transmittable. The touch sensor may be mounted onto a front surface of the window 210*a* to convert the change in a voltage generated on a particular portion into an electrical input signal.

The display module 210*b* may be mounted onto a rear surface of the window 210*a*. This exemplary embodiment illustrates a thin film transistor-liquid crystal display (TFT LCD) as an example of the display module 210*b*, but the present disclosure may not be limited to this. For example, the display module 210*b* may be an LCD module, an organic light-emitting diode (OLED) module, a flexible display module, a 3D display module or the like.

The printed circuit board 250, as aforementioned, may be formed on the one surface of the frame 241, but alternatively mounted on a lower portion of the display module 210*b*. At least one electronic element may be mounted on a lower surface of the printed circuit board 250.

A receiving portion for receiving the battery 240 may be formed on the frame 241 in a recessed form. A contact terminal, which is connected to the printed circuit board 250 such that the battery 240 can supply power to the terminal body 204, may be formed on one side surface of the battery receiving portion.

An antenna element may be formed on an upper or lower end of the mobile terminal. Also, the antenna element may be provided in plurality so as to be located on each end portion of the terminal. The respective antenna elements may be formed to transmit and receive wireless signals of different frequency bands.

The frame 241 may be made of a metal to sustain full rigidity even though it is formed thin. The metallic frame 241 may operate as a ground. That is, the printed circuit board 250 or the antenna element may be ground-connected to the frame 241, and the frame 241 may operate as a ground of the printed circuit board 250 or the antenna element. Here, the frame 241 may extend the ground of the mobile terminal.

The printed circuit board 250 may be electrically connected to the antenna elements to process wireless signals (or wireless electromagnetic waves) transmitted and received via the antenna elements. To process the wireless signals, a plurality of transmission and reception circuits 251 may be formed or mounted on the printed circuit board 250.

The transmission and reception circuits 251 may include one or more integrated circuits and associated electrical devices. As one example, the transmission and reception circuits may include a transmission integrated circuit, a reception integrated circuit, a switching circuit, an amplifier, and the like.

The plurality of transmission and reception circuits 251 may simultaneously feed conductive members which are radiators. This may allow the plurality of antenna elements to operate at the same time. For example, while one antenna element performs transmission another one may perform reception, or both antenna elements may perform reception. Other appropriate configurations are possible depending on the desired application and function.

A coaxial cable may connect the printed circuit board 250 to each of the antenna elements. As one example, the coaxial cable may be connected to feeders for feeding the antenna elements. The feeders may be formed on one surface of the printed circuit board 250, which processes signals input from the signal input device 217. Another surface of the printed circuit board 250 (or 260) may be coupled to a signal transfer device 217*a* for transferring a signal of the signal input device 217. Here, a dome may be formed on the another surface of the printed circuit board 250, and an actuator may be formed in the signal transfer device 217*a*.

Figure 5:
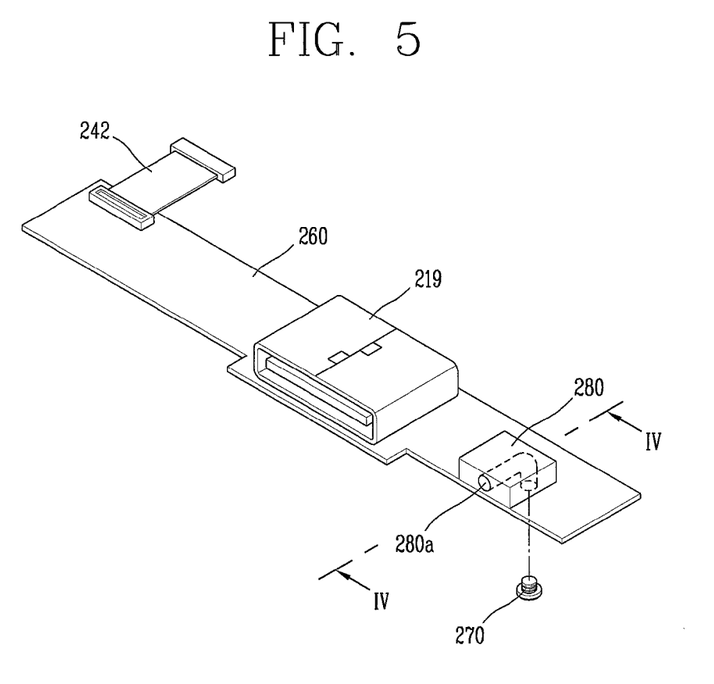
FIG. 5 is an enlarged perspective view of a part A shown in FIG. 4, which shows a microphone mounted on one surface of a printed circuit board according to one exemplary embodiment.
Figure 6:
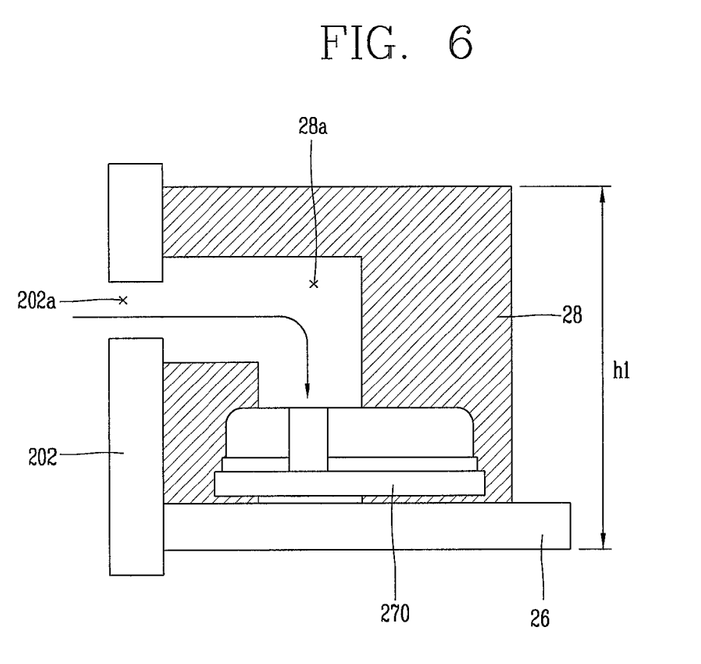
FIG. 6 is a sectional view taken along the line IV-IV of FIG. 5 according to one exemplary embodiment.
Figure 7:
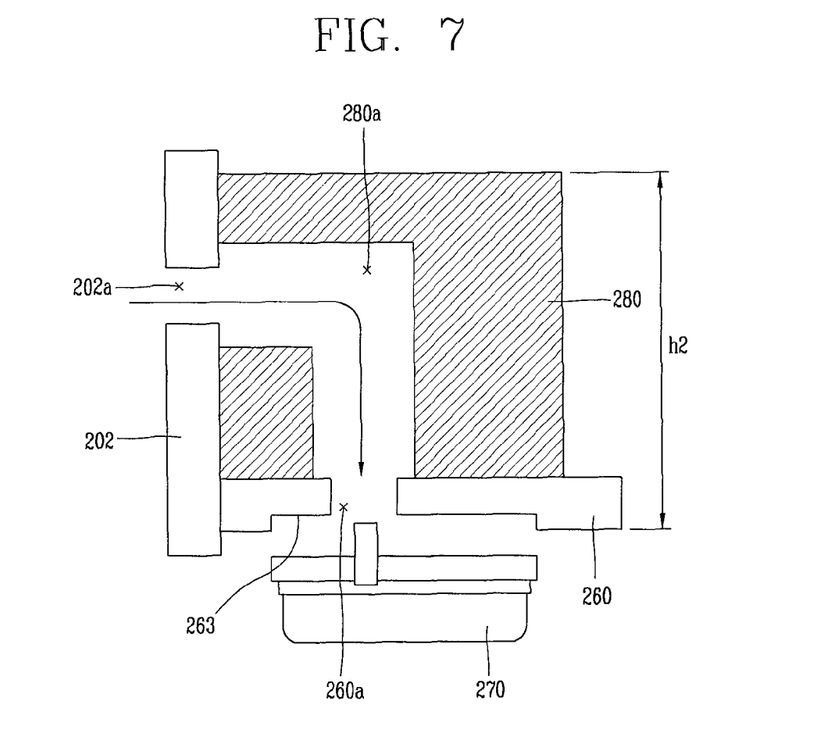
FIG. 7 is a sectional view taken along the line IV-IV of FIG. 5 according to another exemplary embodiment.

FIG. 5 is an enlarged perspective view of a part A shown in FIG. 4, which shows a first exemplary embodiment that a microphone is mounted on one surface of a printed circuit board. FIG. 6 is a sectional view taken along the line IV-IV of FIG. 5 according to one embodiment. FIG. 7 is a sectional view taken along the line IV-IV of FIG. 5 according to another embodiment.

As shown in FIG. 5, a connection member 280 may be coupled to one surface of a printed circuit board 260, and a microphone 270 may be connected to another surface of the printed circuit board 260. The microphone 270 may not be limited to a specific type, but indicate an element which changes a sound into an electrical signal to transfer to the printed circuit board 260. The microphone 270 may be implemented, according to a method of changing a sound into an electrical signal, as a carbon-type microphone, a crystal microphone, a movable coil type microphone, a ribbon-type microphone, a condenser microphone, a semiconductor type microphone, or another appropriate type of microphone.

The carbon-type microphone uses the change in electric resistance of a set of carbon particles due to pressure. The crystal microphone uses a piezoelectric effect such as Rochelle salt so as to be called a piezo microphone. The movable coil type microphone is configured by winding a coil on a light vibration plate, vibrating the coil-wound plate within a magnetic field, and generating an induced current on the coil. The ribbon-type microphone is configured such that a metal foil ribbon is vibrated by receiving sound waves to generate an induced current. The condenser microphone is configured to form a condenser by disposing a thin vibrating plate and the same shape of fixed electrode to face each other with a close distance. Accordingly, vibration of the plate due to sound waves may be converted into the change in capacitance. Also, the semiconductor type microphone uses a stress semiconductor that electric resistance changes in response to a mechanical force. This type of microphone may be produced in a small size, so as to be usually mounted in the mobile terminal according to the present disclosure.

The printed circuit board 260 may be implemented as a multi-layered printed circuit board, or as a flexible printed circuit board. A dome for receiving a signal input through the signal input device may be formed on the another surface of the printed circuit board 260. The printed circuit board 260 may transfer a signal to another printed circuit board 250 via the flexible printed circuit board.

The connection member 280 may be formed of flexible rubber or synthetic resin. A connection hole 280*a* may be formed in the connection member 280. The connection hole 280*a* may transfer a sound received through a microphone hole 202*a* to the microphone 270.

The microphone hole 202*a* may be formed on a side surface of the terminal body 204. That is, the microphone hole 202*a* may be formed on the case 202 which defines the appearance of the terminal body and covers the side surface of the terminal body. When the microphone hole 202*a* is formed on an upper or lower surface of the terminal body 204, dust or water may enter the microphone hole 202*a* through, for example, user's carelessness. For this as well as other reasons, the microphone hole 202*a* may be positioned on the side surface of the terminal body. As the microphone hole 202*a* is thus formed on the side surface of the terminal body and the microphone 270 is disposed to receive sounds from a lateral direction, the connection hole 280*a* may be angled, for example, at a right angle such that the microphone 270 and the microphone hole 202*a* may communicate with each other through the connection hole 280*a*. Hence, the connection hole 280*a* may guide the sound signals from the microphone hole 202*a* to the microphone 270.

As shown in FIG. 6, the microphone 270 may be mounted on an upper surface of a printed circuit board 26 and a connection member 28 may cover the microphone 270. A connection hole 28*a* (or channel) may be formed in the connection member 28 to communicate with (be connected to) the microphone hole 202*a* formed on the side surface of the case 202. Accordingly, a sound received through the microphone hole 202*a* may be guided up to the microphone 270.

However, according to the scheme, since the microphone 270 is mounted on an upper surface of the printed circuit board 260 (e.g., a surface closest to the microphone hole 202*a*) and the connection member 28 covers the microphone 270, a height h1 corresponding to the sum of thicknesses of the microphone 270 and the connection member 28 may be required. This may increase the thickness of the mobile terminal.

Also, since the microphone 270 and the connection member 28 requires coupling in a closely adhered state, the shape of the microphone 270 becomes an important factor when the connection member 28 is formed, limiting the type, size or shape of the microphone 270. This may result in complexity of designing the terminal. That is, sound leakage may occur unless the microphone 270 and the connection member 28 are closely adhered. Also, when the connection member 28 presses against the microphone 270 by more than a prescribed amount of pressure, the microphone 270 may be damaged or the microphone 270 may become dislodged from the printed circuit board 260.

Referring to FIG. 7, the microphone 270 may be mounted on the lower surface of the printed circuit board 260 and the connection member 280 may be formed on the upper surface of the printed circuit board 260. Here, the printed circuit board 260 may include a microphone receiving portion 263 which may be recessed in the lower surface by an area corresponding to the microphone 270. Recessing the microphone receiving portion 263 may allow fabrication of a slimmer terminal.

The printed circuit board 260 may also include a guide hole 260*a* which is connected to the connection hole 280*a* (or channel) of the connection member 280. The guide hole 260*a* may penetrate through the printed circuit board 260. The guide hole 260*a* may be connected up to the microphone hole 202*a* of the case 202 through the connection hole 280*a*. To this end, the connection hole 280*a* may perpendicularly extend from the guide hole 260*a* up to a preset height, and then angled to extend to the microphone hole 202*a*. That is, the connection hole 280*a* may have a perpendicularly extending portion and a horizontally extending portion, which may form a right angle, as illustrated in FIG. 7.

When the printed circuit board 260 is provided with the guide hole 260*a* as shown in FIG. 7, a thickness h2 corresponding to a total thickness of the printed circuit board 260, the microphone 270 and the connection member 280 may become slimmer. In addition, since the connection member 280 is coupled directly to the printed circuit board 280, the connection member 280 may be fabricated in a more simplified shape and with a slimmer thickness.

Also, since the microphone 270 is mounted onto the surface of the printed circuit board 260 opposite the connection member 280, a mounting space of the microphone 270 may be increased. Therefore, flexibility is increased in the type, size, shape, etc., of a microphone which may be mounted onto the printed circuit board 260.

Figure 8:
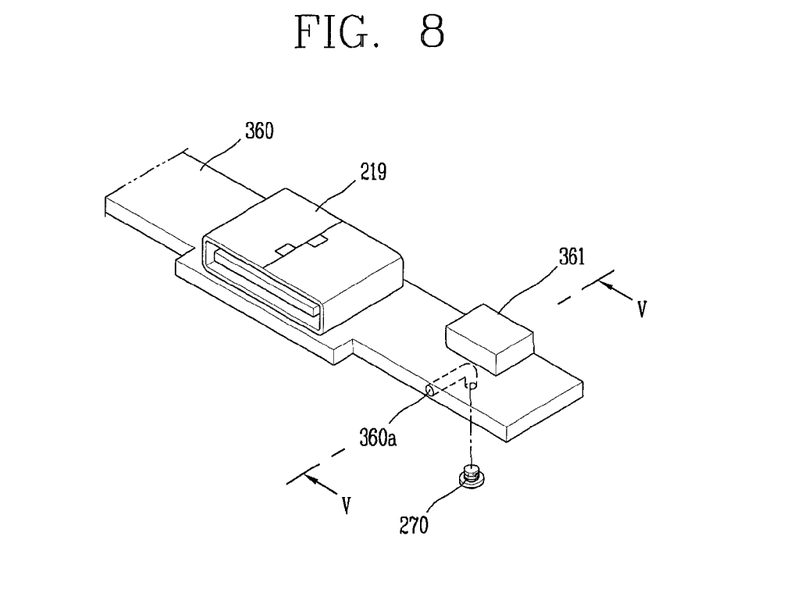
FIG. 8 is an enlarged perspective view of a part A shown in FIG. 4, which shows a microphone mounted on one surface of a printed circuit board according to another exemplary embodiment.
Figure 9:
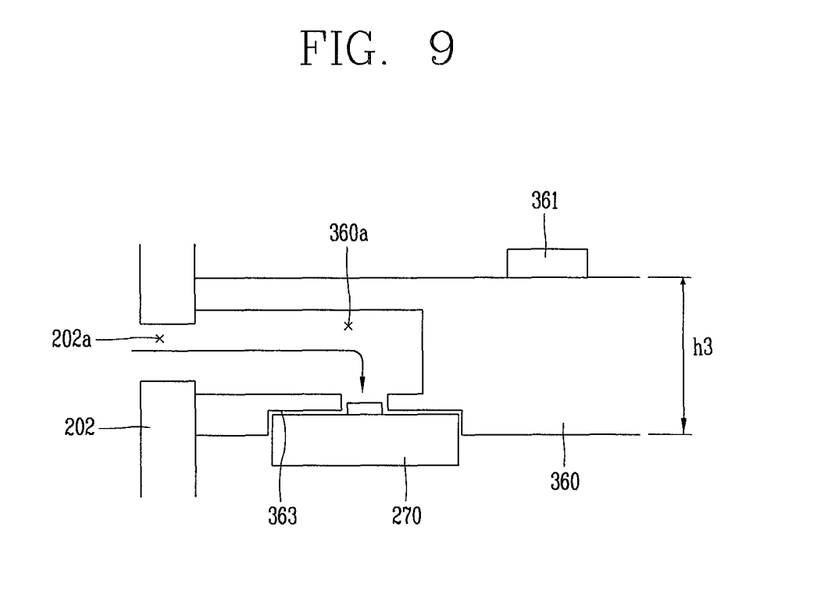
FIG. 9 is a sectional view taken along the line V-V of FIG. 8.

FIG. 8 is an enlarged perspective view of a part A shown in FIG. 4, according to another exemplary embodiment, and FIG. 9 is a sectional view taken along the line V-V of FIG. 8. The microphone 270 may be provided on a lower surface of a printed circuit board 360. Without a connection member on the upper surface of the printed circuit board 360, a guide hole 360*a* of the printed circuit board 360 may extend from the microphone 270 to the microphone hole 202*a*. For example, the guide hole 360*a* may be formed as a channel, conduit, duct, or another appropriate type of structure.

That is, the guide hole 360*a* of the printed circuit board 360 may perpendicularly extend from the microphone 270 up to a predetermined height and then be bent to be open toward a side surface of the printed circuit board 360 such that the microphone hole 202*a* and the microphone 270 can communicate with (be connected to) each other. That is, the guide hole 360a may have a perpendicularly extending portion and a horizontally extending portion to have an right angle shape, as illustrated in FIG. 9. As such, a connection member may be omitted and the guide hole 360a may be formed directly on the printed circuit board 360 such that the microphone hole 202a and the microphone 270 can be connected to each other. This may result in a further reduction of the thickness h3 than in the previous exemplary embodiment, thereby allowing for a slimmer terminal.

The printed circuit board 360 may further include a microphone receiving portion 363 which is recessed in the lower surface of the printed circuit board 360 by an area corresponding to the microphone 270. This may allow the terminal to be slimmer. Also, since the microphone 270 is mounted on the lower surface of the printed circuit board 360, a mounting space of the microphone 270 may be larger than when provided on the upper surface. Therefore, a microphone having various shapes and more improved functions may be mounted on the printed circuit board even when the microphone has a greater form factor.

Without the connection member on the upper surface of the printed circuit board 360, such empty space may be utilized to dispose electrical devices 361, which perform predetermined functions of the mobile terminal. The electrical devices 361 may generate heat as they operate. A scheme for controlling such heat generation is described hereinafter with reference to FIG. 10.

Figure 10:
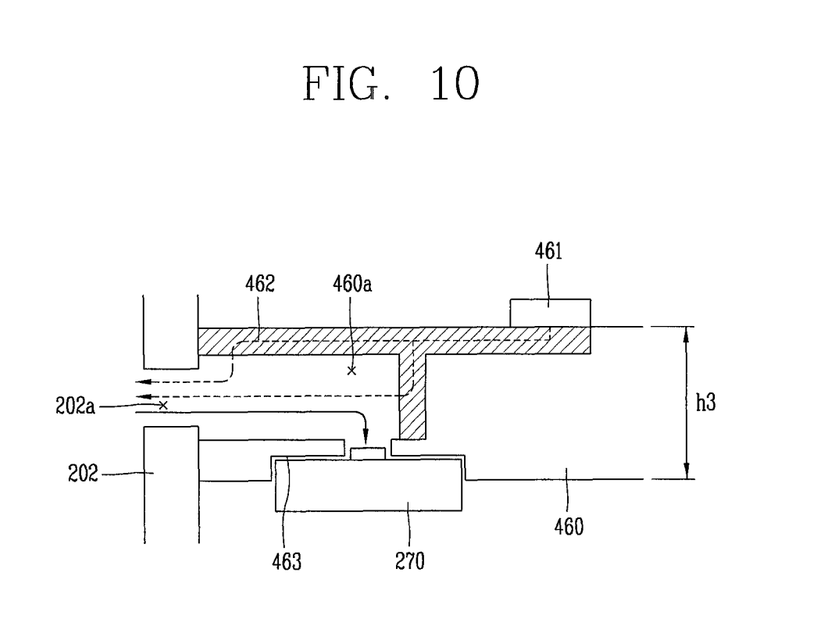
FIG. 10 is a sectional view taken along the line V-V of FIG. 8 according to another exemplary embodiment.

FIG. 10 is a sectional view taken along the line V-V of FIG. 8 according to another exemplary embodiment. An electrical device 461 may be a heat generating component such as a microprocessor. As one example, the electrical device 461 may be a mobile solution module (MSM). The electrical device 461 may generate excess amounts of heat, and the generated heat may cause internal temperatures of the terminal to rise above a desired level. Therefore, to control such generated heat, a heat radiating portion may be provided on an inner surface of a guide hole 460a (or channel). For example, the heat radiating portion may be provided on the inner circumference of the guide hole 460a to be exposed to air in the guide hole 460a.

The guide hole 460a may be formed in a printed circuit board 460 and a part of the printed circuit board 460 which defines the guide hole 460a may form a radiating portion 462. Accordingly, the radiating portion 462 formed as a thermal conductor may be exposed through the guide hole 460a. One side of the radiating portion 462 may directly or proximately come in contact with the electrical device 461, and the other side of the radiating portion 462 may be exposed through the inner circumference of the guide hole 460a. That is, the radiating portion 462 may partially extend from the electrical device 461 to the guide hole 460a. Consequently, the heat from the electrical device 461 may be transmitted along the radiating portion 462 to be radiated through the guide hole 460a.

The radiating portion 462 may be formed such that an area exposed to the inner circumference of the guide hole 460a is increased to enhance heat dissipation. Also, the radiating portion 462 may extend to the side surface of the printed circuit board 460 so as to be brought into contact with the case 202. Here, at least part of the case 202 contacting the radiating portion 462 may be formed of a metal with high thermal conductivity to further dissipate the heat through the case 202.

Figure 11:
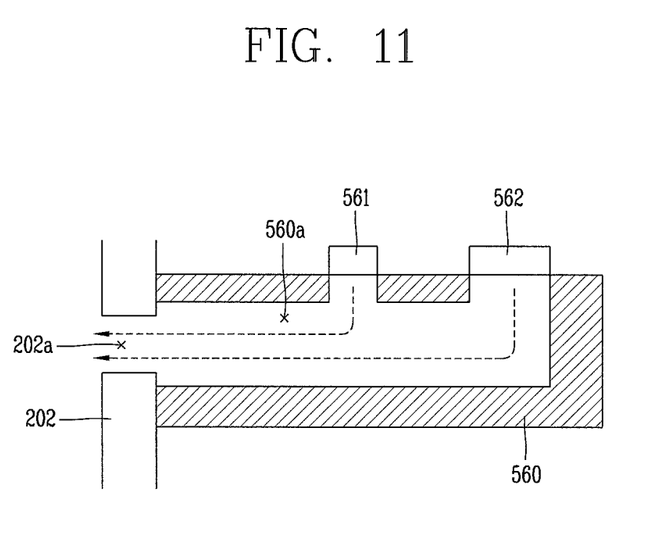
FIG. 11 is a sectional view taken along the line IV-IV of FIG. 5 according to another exemplary embodiment.

FIG. 11 is a sectional view taken along the line IV-IV of FIG. 5 according to one exemplary embodiment. A plurality of electrical devices 561 and 562 may be mounted on one surface of a printed circuit board 560. The electrical devices 561 and 562 may be generate heat during operation. The heat generated by the electrical devices 561 and 562 may increase internal temperature of the terminal above a desired level. To control such generated heat, the printed circuit board 560 may include a guide hole 560a (or channel). The guide hole 560a may be connected to each of the electrical devices 561 and 562.

The guide hole 560a may be open to one side surface of the printed circuit board 560. The opening may be connected to the hole 202a of the case 202. The other end of the guide hole 560a may extend under the electrical device 561, 562 and may be thermally coupled to the electrical devices 561, 562, for example, to extend to a mounting pad for the printed circuit board 560, to the device itself, or the like. Here, the guide hole 560a may be connected from the electrical devices 561, 562 to the hole 202a formed on the case 202. As the printed circuit board 560 includes such a guide hole 560a connected to each of the electrical devices 561 and 562, heat generated by the electrical devices 561 and 562 may be radiated to the outside through the guide hole 560a.

Figure 12:
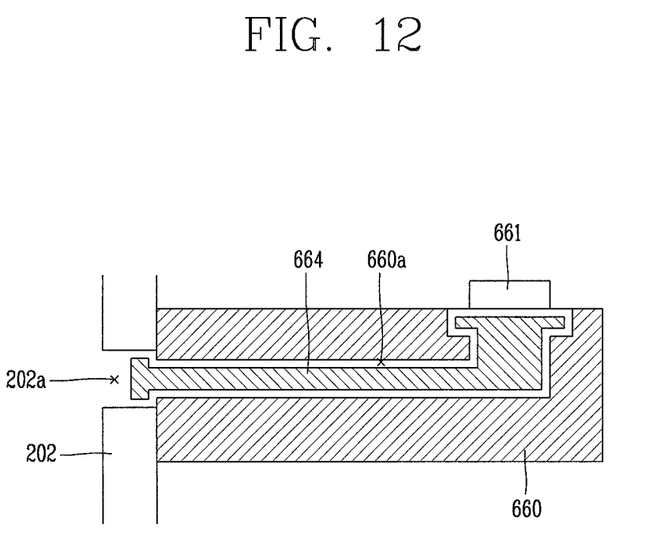
FIG. 12 is a sectional view taken along the line IV-IV of FIG. 5 according to another exemplary embodiment.

FIG. 12 is a sectional view taken along the line IV-IV of FIG. 5 according to another exemplary embodiment. At least one electrical device 661 may be mounted on one surface of a printed circuit board 660. Each electrical device 661 may generate heat during operation. The heat generated by the electrical device 661 may increase internal temperature of the terminal above a desired level. To control heat generated by the electrical device 661, the printed circuit board 660 may include a guide hole 660a (or channel). Here, a heat transfer device 664 (or heat sink device) formed as a thermal conductor or heat sink may be inserted in the guide hole 660a.

The guide hole 660a may be connected to each of the at least one electrical device 661. One end of the heat transfer device 664 may come in contact with the electrical device 661, and the other end of the heat transfer device 664 may extend to the hole 202a formed on the case 202. Here, when the case 202 is a thermal conductor, the case 202 and the heat transfer device 664 may be formed to come in contact with each other.

As the printed circuit board 660 is provided with such a guide hole 660a connecting the electrical device 661 and the heat transfer device 664 is provided in the guide hole 660a, heat generated by the electrical device 661 may be radiated to the outside through the guide hole 660a and the heat transfer device 664.

The guide holes of the printed circuit board, described in the foregoing exemplary embodiments, may be formed by inwardly punching or drilling one side of a previously formed printed circuit board using a punching tool, a drill, or another appropriate tool or method. Alternatively, for a multi-layered printed circuit board, after each layer is formed to have an opening with a shape corresponding to a guide hole, the layers may be stacked and coupled together. For example, for a multi-layered printed circuit board having five layers, an upper portion of a guide hole and a lower portion of the guide hole may be formed, respectively, on a third layer and a fourth layer, which are located at a depth where the guide hole is to be formed, and thereafter the first to fifth layers may be coupled to form a multi-layered printed circuit board having the guide hole.

As broadly described and embodied herein, a mobile terminal may be made slimmer by simplifying an assembly process of a microphone as well as a printed circuit board and a mounting space of the microphone. Another aspect of the detailed description is to provide a more stable physical/electrical connection between a microphone and a printed circuit board.

In one embodiment, mobile terminal may include a terminal body, a printed circuit board provided in the terminal body, and a microphone provided on the printed circuit board a prescribed distance from the terminal body. The printed circuit board may be provided between an opening in the terminal body and the microphone, and a channel may be provided that extends from the opening in the terminal body to the microphone.

A first surface of the printed circuit board may be provided closer to the opening in the terminal body than a second surface of the printed circuit board, the microphone being provided at the second surface. The first surface may be an upper surface of the printed circuit board and second surfaces may be a lower surface of the printed circuit board, the first and second surfaces being opposite surfaces.

The printed circuit board may extend perpendicular to the terminal body and a connection member is provided adjacent the terminal body and the printed circuit board, and the channel may be provided in the connection member and extends from the opening in the terminal body to the first surface of the printed circuit board.

A hole may be formed through the printed circuit board to correspond to the microphone and the channel. A diameter of the channel may be greater than a diameter of the opening in the terminal body or the hole in the printed circuit board.

The opening in the terminal body may be formed on a side surface of the terminal body. The channel may extend perpendicular to the printed circuit board, and may be angled at a prescribed angle to extend to the opening in the terminal case. The connection member may be made of elastic rubber or synthetic resin.

Moreover, the first surface may be a lateral surface of the printed circuit board and the second surface may be an upper or lower surface of the printed circuit board, and wherein the first surface is positioned to cover at least a portion of the opening and the second surface extends perpendicular to the terminal body. The channel may be formed in the printed circuit board, a first distal end of the channel being provided on the later surface of the printed circuit board and a second distal end of the channel being provided on the upper or lower surface of the printed circuit board at the microphone.

The mobile terminal may further include a heat sink device provided on a surface in the channel, the heat sink device being thermally coupled to an electrical device mounted on the printed circuit board to dissipate heat generated by the electrical device through the channel. The heat sink device contacts the terminal body and at least a portion of the terminal body that contacts the heat sink device is made of a metal. The mobile terminal may further include a heat sink device that thermally couples the electrical device to the opening in the terminal body, the heat sink device provided such that a gap is provided between the heat sink device and a surface of the channel.

In one embodiment, a mobile terminal may include a terminal body, a printed circuit board provided in the terminal body, and an electric device provided on a surface of the printed circuit board. The electrical device may be provided on the printed circuit board a prescribed distance from the terminal body, and a channel formed through the printed circuit board may extend from an opening in the terminal body to the electrical device such that heat generated by the electrical device is dissipated through the channel and the opening.

A thermal conductor may be provided on a surface of the channel. The thermal conductor may extend from the electrical device to the opening. The thermal conductor device may also extend from the electrical device to a lateral surface of the printed circuit board that contacts the terminal body, wherein at least a portion of the terminal body that contacts the thermal conductor device is made of a metal.

A heat sink device may be provided that thermally couples the electrical device to the opening in the terminal body. The heat sink device may be provided such that a gap is provided between the heat sink device and a surface of the channel. Moreover, the channel may extend from the opening in the terminal body to a microphone provided on a surface of the printed circuit board, and configured to guide sound through the opening to the microphone.

In one embodiment, a mobile terminal may include a case defining an appearance of a terminal body, and having a microphone hole, and a printed circuit board mounted in the terminal body and having a microphone mounted thereon, wherein the printed circuit board may include a guide hole connected to the microphone hole.

The mobile terminal may further include a connection hole located between the case and the printed circuit board, and connected to the guide hole and the microphone hole, respectively. The guide hole may be formed through the printed circuit board. The microphone hole may be formed on a side surface of the terminal body.

The connection hole may perpendicularly extend to be connected to the guide hole, and then be bent to be connected to the microphone hole. The connection hole may be formed on a connection member, which is made of elastic rubber or synthetic resin. A diameter of the connection hole may be greater than that of the guide hole or the microphone hole.

The microphone may be mounted on an upper or lower surface of the printed circuit board, and the guide hole may perpendicularly extend to be connected to the microphone and then be bent to be open toward a side surface of the printed circuit board.

The mobile terminal may further include a radiating portion formed as a thermal conductor on an inner circumference of the guide hole. The radiating portion may be formed to externally radiate heat generated by electrical devices, mounted on the printed circuit board, through the guide hole. The radiating portion may partially extend from the electrical device to the guide hole. The radiating portion may partially extend from the electrical device to a side surface of the printed circuit board, which comes in contact with the case. At least part of the case coming in contact with the radiating portion may be made of a metal.

In one embodiment, a mobile terminal may include a case defining an appearance of a terminal body and having a hole, and a printed circuit board mounted in the terminal body, wherein an electric device may be mounted on one surface of the printed circuit board, wherein the printed circuit board may include a guide hole connected to the hole such that heat generated by the electrical device is externally radiated through the hole.

A heat transfer unit may be inserted into the guide hole. The heat transfer unit may partially extend from the electrical device to the hole. The heat transfer may partially extend from the electrical device to the side surface of the printed circuit board, which comes in contact with the case. At least part of the case coming in contact with the heat transfer unit may be made of a metal.

In accordance with at least one exemplary embodiment having such configuration, the mobile terminal may have a guide hole formed on a printed circuit board, whereby a total thickness of the printed circuit board, a microphone and a connection member may be more reduced. Also, with the connection member directly coupled to the printed circuit board, the connection member may be fabricated to have a more simplified shape and a more reduced thickness.

Also, the microphone may be mounted on another surface of the printed circuit board. This may allow a microphone which is in various shapes and has improved functions to be mounted on the printed circuit board even if the microphone has a large volume. Moreover, the radiating portion may be exposed through the guide hole, so as to externally radiate heat generated due to operation of electric devices.

It should be appreciated that suffixes "module," "unit" or "portion" as used in the present disclosure are merely used for ease of description, and should not be construed to convey a specific meaning or function other than what is described. Moreover, the terms "module," "unit" and "portion" may be used interchangeably in the present disclosure.

Any reference in this specification to "one embodiment," "an embodiment," "example embodiment," etc., means that a particular feature, structure, or characteristic described in connection with the embodiment is included in at least one embodiment of the disclosure. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A mobile terminal comprising:
a terminal body;
a printed circuit board provided in the terminal body; and
a microphone provided on the printed circuit board a prescribed distance from the terminal body,
wherein the printed circuit board is provided between an opening in the terminal body and the microphone, and a channel is provided that extends from the opening in the terminal body to the microphone, and
wherein the mobile terminal further includes a heat sink device provided on a surface in the channel, the heat sink device being thermally coupled to an electrical device mounted on the printed circuit board to dissipate heat generated by the electrical device through the channel.

2. The mobile terminal of claim 1, wherein a first surface of the printed circuit board is provided closer to the opening in the terminal body than a second surface of the printed circuit board, the microphone being provided at the second surface.

3. The mobile terminal of claim 2, wherein the first surface is an upper surface of the printed circuit board and second surface is a lower surface of the printed circuit board, the first and second surfaces being opposite surfaces.

4. The mobile terminal of claim 3, wherein the printed circuit board extends perpendicular to the terminal body and a connection member is provided adjacent the terminal body and the printed circuit board, and
wherein the channel is provided in the connection member and extends from the opening in the terminal body to the first surface of the printed circuit board.

5. The mobile terminal of claim 4, wherein a hole is formed through the printed circuit board to correspond to the microphone and the channel.

6. The mobile terminal of claim 5, wherein a diameter of the channel is greater than a diameter of the opening in the terminal body or the hole in the printed circuit board.

7. The mobile terminal of claim 4, wherein the opening in the terminal body is formed on a side surface of the terminal body.

8. The mobile terminal of claim 7, wherein the channel extends perpendicular to the printed circuit board, and is angled at a prescribed angle to extend to the opening in the terminal case.

9. The mobile terminal of claim 4, wherein the connection member is made of elastic rubber or synthetic resin.

10. The mobile terminal of claim 2, wherein the first surface is a lateral surface of the printed circuit board and the second surface is an upper or lower surface of the printed circuit board, and wherein the first surface is positioned to cover at least a portion of the opening and the second surface extends perpendicular to the terminal body.

11. The mobile terminal of claim 10, wherein the channel is formed in the printed circuit board, a first distal end of the channel being provided on the lateral surface of the printed circuit board and a second distal end of the channel being provided on the upper or lower surface of the printed circuit board at the microphone.

12. The mobile terminal of claim 1, wherein the heat sink device contacts the terminal body and at least a portion of the terminal body that contacts the heat sink device is made of a metal.

13. The mobile terminal of claim 1, wherein the heat sink device is provided such that a gap is provided between the heat sink device and a surface of the channel.

* * * * *